United States Patent Office 3,745,040
Patented July 10, 1973

3,745,040
RESINOUS SURFACE COVERING AND PROCESS FOR PRODUCING SAME
John Fraser Morton and James C. Schlaffer, Westminster, Md., Robert J. Eitzel, Wilmington, Del., and Joseph A. Fowler, Swarthmore, Pa., assignors to Congoleum Industries, Inc., Kearny, N.J.
No Drawing. Filed Jan. 26, 1971, Ser. No. 109,937
Int. Cl. B32b 5/20; D06n 3/04
U.S. Cl. 117—76 FB    26 Claims

ABSTRACT OF THE DISCLOSURE

A process for producing a resinous surface covering including impregnating a felted cellulosic backing layer with 40% to about 85% by weight of the dry felt with a resinous strengthening impregnant, coating the backing layer with a foamable resin including a stabilizer such as organotin compounds and mixtures thereof, coating the foamable resin with a non-foamable resin having an organotin stabilizer therein, and heating the layered article to foam the foamable resin and fuse the non-foamable resin to thereby produce a surface covering having a high resistance to delamination and discoloration at high temperatures, and the product so produced.

This invention relates to a method for producing a resinous surface covering suitable for use in areas of extreme wear, where such products would be subject to conditions such as abrasion, gouging, and temperature extremes.

BACKGROUND AND OBJECTS

Sheets of resinous compositions have found wide spread use as decorative and wear-resistant coverings for a wide range of products. Such sheets, for example, are used extensively as wall, floor, and table coverings, book covers, decorative containers, as fabrics for use as upholstery, clothing, and automobile interiors, and the like. In many instances, the resinous composition sheets are applied or formed on backings such as woven fabrics, paper, felt, metal, wood, glass and the like. These backing materials have many purposes, the most common being added strength and serviceability. It is common practice to emboss the surface of such sheets to give added decorative appeal and, in many instances, further utility.

Typical of the types of embossings are those which simulate leather or textured cloth. In some instances, the embossed areas are filled in with pigmented ink by techniques known as "spanishing" or "valley printing." Designs have also been printed on the surface of resinous composition sheets and in many instances, the designs have been protected by the application of a transparent or translucent over coating.

The introduction of cellular resinous composition has led to their incorporation in products such as recited above, particularly in combination with non-cellular resinous composition surface wearlayers and backing webs.

The high durability and aesthetic appeal of this type of product has been one of the main factors contributing to its wide spread use in a variety of applications. This wide spread use of this type of product has pointed out that in areas of extreme wear conditions, the prior art products have a number of disadvantages which make the use of these products objectionable in certain areas. A specific example of this would be in the area of rear deck coverings for use in automobile station wagons. Coverings used for this purpose are frequently subjected to rough usage such as for example, when heavy articles are slid into the station wagon. In an embossed product of this type, the articles or their corners may catch in the valleys of the embossing and gouge or tear the wearlayer of the surface covering, or separate the layers of the product. Further, an automobile which is closed up tight and parked in the sun can easily be subjected to interior temperatures on the order of 150°–175° F. Or, in the winter, the interior temperature of the vehicle in many cases will go as low as −20° F. to −30° F. These temperature extremes cause serious damage to the surface covering resulting in delamination of the layers of the covering, brittleness in the surface covering, and discoloration of the product.

While the wearlayer is usually highly resistant to any gouging or abrasion, the backing layer in prior art surface coverings has not been able to achieve the requisite durability. One of the primary reasons for this lack of durability in the felt layer is that it is a compromise between cost and durability. The felt layer used in prior art surface coverings has included resinous impregnants to add some degree of strength to the product, however, this has been on the order of 25–30% of a resinous impregnant based on the weight of the dry felt. The product so produced, while having good wear properties for use in residential floor and wall coverings, and the like, has suffered considerably from the wear to which it is subjected in such areas a automobiles.

Accordingly, a primary object of this invention is to overcome the disadvantages of the prior art surface coverings.

Another object of this invention is to provide a resinous surface covering having excellent wear resistance when used in areas of high abuse.

A further object of this invention is to provide a resinous surface covering having a very high resistance to delamination and discoloration at high temperatures.

Still another object of this invention is to provide a resinous surface covering having good flexibility at low temperatures.

Still a further object of this invention is to provide a resinous surface covering having a highly impregnated cellulosic felt backing layer.

Yet a further object of this invention is to provide a resinous surface covering having a tin stabilizer in the wearlayer to provide good delamination and discoloration resistance in the product.

Still another object of this invention is to provide a resinous surface covering having a tin stabilizer in the intermediate foam layer to provide a high resistance to delamination and discoloration, especially at high temperatures.

These and other objects and advantages of this invention will become apparent when considered in light of the following descripiton and claims:

DESCRIPTION OF THE INVENTION

We have now found that by providing a surface covering product having a highly impregnated cellulosic felt backing layer and a resinous wearlayer having a stabilizer therein, a product overcoming the disadvantages of prior art products can be produced.

The felt backing layer is formed in a conventional manner on a paper machine such as a Fourdrinier machine, and the fiber furnish consists preferably of approximately 70% rag and 30% re-pulped kraft fibers. However, a satisfactory product could be produced from a furnish containing from about 20% to about 90% rag fibers with the remainder composed of blends of kraft and/or other wood fibers.

Preferably, the dry felt would have a gauge of approximately 0.040 inch, and a 480 square foot sample would have a weight of approximately 36 pounds. However, the weight and gauge are interdependent factors and the gauge to weight ratio would be on the order of 0.80–1.20 to 1 for the dry felt. The gauge-to-weight ratio is computed as $$\frac{\text{Thickness of felt (inches)}}{\text{weight of 480 sq. ft. of felt (pounds)}} \times 1000$$

A typical sample of a finished felt having 480 square feet will weigh 60 pounds at a saturation level of 60%. The sample will have a spring back gauge of 0.039 inch. The weight of the finished felt will be dependent upon the gauge of the felt and the degree of saturation of the felt with the impregnant. The saturant can be present in a range of at least 40% up to 90%, and the spring back gauge will have a range of 0.020 to 0.050 inch. Preferably, the felt will be saturated at a range of 60–80% saturation based on the weight of the dry felt, and the impregnated felt will have a gauge-to-weight ratio of 0.50–0.80 to 1, and preferably 0.6–0.7 to 1.

The saturant used may be any of a number of resins such as vinyl resins, butadiene-styrene latexes, butadiene-acrylonitrile resins, or other similar synthetic rubber like polymers. However, exceptionally good results have been obtained using an acrylic latex impregnant. Other impregnants showing good results are several vinyl chloridevinyl acetate copolymers.

If desired, a suitable tie coat may be applied to the wire side of the felt, however, this is usually not necessary.

The foam intermediate layer is formed from a foamable plastisol which is coated onto the surface of the felt backing layer, and a number of examples of suitable foam plastisols are disclosed in U.S. Patent 3,293,094 to Nairn et al., the specification of which is incorporated herein by reference.

Examples of suitable foamable plastisols for use in this invention are as follows:

Example 1

A foamable plastisol was formulated by mixing the following ingredients:

| | Parts |
|---|---|
| Polyvinyl chloride (dispersion grade, specific viscosity 0.60) | 35 |
| Polyvinyl chloride (dispersion grade, specific viscosity 0.40) | 35 |
| Polyvinyl chloride (suspension grade, specific viscosity 0.35) | 30 |
| Alkyl aryl modified phthalate ester (plasticizer) | 55 |
| Alkyl aryl hydrocarbon (secondary plasticizer) | 10 |
| Zinc oxide | 0.7 |
| Titanium dioxide | 5.0 |
| Azodicarbonamide | 1.7 |

The plastisol, upon heating to decompose the blowing agent, resulted in a thickness of 2.5 times the unblown thickness.

Example 2

A foamable plastisol was formulated by mixing the following ingredients:

| | Pounds |
|---|---|
| Polyvinyl chloride (dispersion grade, specific viscosity 0.60) | 280 |
| Polyvinyl chloride (dispersion grade, specific viscosity 0.40) | 280 |
| Polyvinyl chloride (suspension grade, specific viscosity 0.35) | 250 |
| Santicizer 160 [1] (plasticizer) | 224 |
| Santicizer 261 [2] (plasticizer) | 136 |
| Plasticizer AB 515 (alkyl modified benzene; secondary plasticizer) | 120 |
| Zinc oxide | 5.3 |
| Azodicarbonamide | 14.0 |
| Di(2-ethylhexyl)phthalate (plasticizer) | 10.5 |
| Nuodex V 1444 (grinding aid) | 0.2 |
| Minex 7 (anhydrous sodium potassium aluminum silicate) | 100 |
| TiO$_2$ dispersed in plasticizer at 60% solids | 30 |

[1] Santicizer 160—butyl benzyl phthalate.
[2] Santicizer 261—octyl benzyl phthalate.

| | Grams |
|---|---|
| Blue pigment (Claremount K944 dispersion) | 294 |
| Red pigment (Claremount K3972 dispersion) | 204 |
| Black pigment (Claremount K12054 dispersion) | 13 |

This plastisol formulation upon heating to decompose the blowing agent, resulted in a thickness (0.025 inch) of 2.5 times the unblown thickness (0.010 inch) and a light blue colored foam.

Example 3

A foamable plastisol was formulated by mixing the following ingredients:

| | Pounds |
|---|---|
| Polyvinyl chloride (dispersion grade, specific viscosity 0.60) | 280 |
| Polyvinyl chloride (dispersion grade, specific viscosity 0.40) | 280 |
| Polyvinyl chloride (suspension grade, specific viscosity 0.35) | 250 |
| Santicizer 160 (plasticizer) | 205 |
| Santicizer 261 (plasticizer) | 125 |
| Plasticizer AB515 | 110 |
| Zinc oxide | 5.3 |
| Azodicarbonamide | 14.0 |
| Di(2-ethylhexyl)phthalate | 10.5 |
| Nuodex V1444 | 0.2 |
| Minex 7 | 100 |
| Admex 746 (epoxdized tallate ester) | 40 |
| Nuodex V1525 (stabilizer, dibutyl tin maleate) | 2 |
| TiO$_2$ dispersed in plasticizer at 60% solids | 30 |

| | Grams |
|---|---|
| Blue pigment (Claremount K944 dispersion) | 294 |
| Red pigment (Claremount K3972 dispersion) | 204 |
| Black pigment (Claremount K12054 dispersion) | 13 |

The manner of producing the embossings in the finished product is essentially similar to the method disclosed in the Nairn patent 3,293,094, wherein the foamable plastisol after it is coated on the backing layer, is heated slightly to gel the plastisol, and is then printed with any of a variety of inks as disclosed in Examines 18 to 26 of the Nairn patent, the inks containing an inhibitor in an amount of from 10 to 20% concentration in the ink. The inhibitor serves to alter the decomposition temperature of the blowing agent, the azodicarbonamide, in the foam layer to the extent that differential foaming occurs when the product is finally heated to fuse the resins. For the purposes of this invention, it is preferable to use trimellitic anhydride at 10% concentration in the ink as the inhibitor.

After the gelled, foamable plastisol has been printed with the ink inhibitor, it is then coated with a plastisol which is used to form the wearlayer. The following example is typical of a suitable formulation used for the wearlayer plastisol:

Example 4

The following ingredients in the amounts indicated were mixed:

| | Pounds |
|---|---|
| Polyvinyl chloride (dispersion grade)[1] | 440 |
| Polyvinyl chloride (suspension grade)[2] | 250 |
| Polyvinyl chloride (suspension grade)[3] | 200 |
| Santicizer 267 (plasticizer, dialkyl phthalate) | 325 |
| Eastman TIB (plasticizer, butyrate) | 90 |
| Di(2-ethylhexyl)phthalate (plasticizer) | 48 |
| Epoxidized tall oil ester (secondary plasticizer) | 45 |
| Nuodex V1525 (stabilizer, dibutyl-tin maleate) | 13.5 |
| Tergitol NP14 (viscosity depressant; octylated nonyl phenyl) | 4 |
| Uvinol N-539 (ultraviolet light absorber) | 3 |
| Irgazin violet toner (about 0.007% solids) | 2 |
| Minex 7 (anhydrous sodium potassium aluminum silicate) | 50 |

[1] "Tenneco 1742," Brookfield viscosity with 60 phr. dioctyl phthalate at 77° F.: 2 hours-2 r.p.m. 35 poise; 20 r.p.m. 25 poise; yield 4 dynes/cm.².
[2] "Pliovic M-90," Goodyear; Brookfield viscosity with 60 phr. dioctyl phthalate; 1 hour-2 r.p.m. 10,800 cps.; 20 r.p.m. 7060 cps
[3] "Pliovic M-70," Goodyear; Brookfield viscosity with 60 phr. dioctyl phthalate; 1 hour-2 r.p.m. 4000 cps.; 20 r.p.m. 2950 cps.

Examples 1 and 2 disclose foamable plastisols which which contain no stabilizer for the foam. However, Example 3 discloses a foamable plastisol which includes a tin stabilizer, Nuodex V1525 which is dibutyl-tin maleate, however other suitable tin stabilizers could be used. Preferred are organotin compounds. The tin stabilizer serves to stabilize the foam against the effects of heat and light degradation. The use of a tin stabilizer, as opposed to other metal-complex stabilizers of such metals as barium, cadmium, calcium, zinc, strontium, lead and the like, is critical in that these other stabilizers do not provide the requisite stabilization of the foam at high temperatures. Discoloration of the foam occurs after approximately 15 days at 190° F. However, by utilizing the tin stabilizer, negligible change in the shade or color of the foam was observed after 7 days of 212° F. or 30 days at 190° F.

However, the amount of tin stabilizer used in the foam layer is important in that too much of the tin stabilizer will reduce the depth of the embossing. The following table sets forth foams produced from plastisols and embossed in accordance with the teachings of the Nairn et al. patent, 3,293,094. The concentration of the tin is given in terms of phr., i.e. parts of tin per 100 parts of resin:

TABLE I

| | Pounds | | | | |
|---|---|---|---|---|---|
| Sn, phr | 0 | ¼ | ½ | ¾ | 1 |
| PVC (dispersion grade, specific viscosity 0.60) | 280 | 280 | 280 | 280 | 280 |
| PVC (dispersion grade, specific viscosity 0.40) | 280 | 280 | 280 | 280 | 280 |
| PVC (suspension grade, specific viscosity 0.35) | 250 | 250 | 250 | 250 | 250 |
| Santicizer 160 | 224 | 224 | 224 | 224 | 224 |
| Santicizer 261 | 136 | 136 | 136 | 136 | 136 |
| Plasticizer AB 515 | 110 | 110 | 110 | 110 | 110 |
| Yellow blow mix (pigment, azodicarbonamide, plasticizer) | 30 | 30 | 30 | 30 | 30 |
| White blow mix (pigment, azodicarbonamide, plasticizer) | 54 | 54 | 54 | 54 | 54 |
| Minex 7 | 100 | 100 | 100 | 100 | 100 |
| Admex 746 | 40 | 40 | 40 | 40 | 40 |
| Nuodex V1525 | 0 | 2 | 4 | 6 | 8 |
| Total | 1,474 | 1,476 | 1,478 | 1,480 | 1,482 |
| Full foam thickness (mils) | 47 | 48 | 40 | 37 | 43 |
| Embossed foam thickness (mils) | 22 | 27 | 24 | 24 | 28 |
| Depth of embossing (mils) | 25 | 21 | 16 | 13 | 15 |
| Wearlayer (mils) | 16 | 18½ | 18½ | 18 | 19 |

It is seen from the above data that with 0 phr. tin, the depth of embossing is 0.025 inch and at ¼ phr., ½ phr., ¾ phr., and 1 phr. of tin, the depth of the embossing is 0.021, 0.016, 0.013 and 0.015 inch respectively.

Therefore, it is preferred that the tin be present in a concentration of ¼ phr. in the foam layer. At 0 phr. tin, the foam produced, with no wearlayer applied, discolored readily with the application of heat, but with the other four concentrations of tin, no discoloration occurred in the foam.

The wearlayer formulation of Example 4 provides a clear wearlayer permitting the color of the foam to show through and thusly provide an aesthetic appearance to the product. The stabilizer used, Nuodex V1525 is dibutyl-tin maleate, the same as the stabilizer used in the foam layer. However, other tin compounds could be used as a stabilizer in either the foam or the wearlayer, the most common stabilizers being tin esters. Again, as in the foam layer, the stabilizer must be tin, as other metal stabilizers will permit discoloration at the temperature extremes. In the wearlayer, the tin concentration of Example 4 is approximately 1.5 phr., however, this concentration may vary from ¼ phr. to 3.0 phr., the primary limitation being one of cost.

In the foam composition the zinc oxide present serves primarily as a pigment but additionally, it has a secondary and lesser function as a stabilizer. However, its use is limited to foams in which the color of the zinc oxide is desirable.

The use of the tin stabilizer in the foam and wearlayer provides a synergistic effect with the high impregnation of the felt backing with the acrylic or other resins and produces the unexpected results of stability and durability in the overall product. Additionally, with the high impregnated backing layer and the stabilized plastisol used for the wearlayer, a thicker wearlayer may be formed in the product, again increasing the durability of the end product. While resinuous surface coverings for use in general residential applications have a wearlayer of 0.003-0.010 inch, the wearlayer of the present invention may range from 0.010 to 0.050 inch. Since the wearlayer composition is a very durable material, this added thickness also increases the durability of the end product.

Furthermore, the felt backing layer of this invention has a high internal strength as compared to that of prior art surface coverings. While the prior surface coverings have a tensile strength of 1.5-2.0 pounds as measured by a Scott tensile tester, the felt of the present invention has a tensile strength of 7.5-8.0 pounds, another factor adding to the overall durability of the product.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. In a resinous surface covering of the type including a resinous wearlayer, a foamed resinous interlayer, and a felted, cellulosic backing layer, the improvement wherein:
   (a) said felted, cellulosic backing layer includes 40% to about 85% of a synthetic resinuous strengthening impregnant based on the dry weight of the felt and selected from the group consisting of polymerized vinyl halides, butadiene-styrene latexes, butadiene-acrylonitrile resins, acrylic latex and vinyl chloride-vinyl acetate copolymers,
   (b) said resinuous wearlayer including about 0.25 to about 3.00 phr. of a tin stabilizer,
   (c) said surface covering being highly resistant to delamination and discoloration at high temperatures.

2. A resinous surface covering as in claim 1 and wherein:
   (a) said tin stabilizer consists essentially of an organotin stabilizer.

3. A resinous surface covering as in claim 2 and wherein:
   (a) said organotin stabilizer consists essentially of dibutyl-tin maleate.
4. A resinous surface covering as in claim 1 and wherein:
   (a) said foamed resinuous interlayer includes a minor proportion of a tin stabilizer.
5. A resinous surface covering as in claim 4 and wherein:
   (a) said tin stabilizer in said interlayer consists essentially of an organotin ester.
6. A resinous surface covering as in claim 5 and wherein:
   (a) said organotin ester consists essentially of dibutyl-tin maleate.
7. A resinous surface covering as in claim 6 and wherein:
   (a) said foam interlayer further includes a minor amount of zinc oxide.
8. A resinous surface covering as in claim 1 and wherein:
   (a) said felted, cellulosic backing layer has a gauge-to-weight ratio before impregnation of from about 0.80 to about 1.20 to 1, and
   (b) said felted, cellulosic backing layer has a gauge-to-weight ratio after impregnation of from about 0.50 to about 0.80 to 1.
9. A resinous surface covering as in claim 8 and wherein:
   (a) said gauge-to-weight ratio after impregnation is from about 0.60 to about 0.70 to 1.
10. A resinous surface covering as in claim 1 and wherein:
    (a) said resinous strengthening impregnant consists essentially of an acrylic latex impregnant.
11. A resinous surface covering as in claim 1 and wherein:
    (a) said resinous strengthening impregnant consists essentially of a vinyl impregnant.
12. A resinous surface covering as in claim 11 and wherein:
    (a) said vinyl impregnant consists essentially of a vinyl chloride vinyl acetate copolymer.
13. A resinous surface covering as in claim 1 and wherein:
    (a) said felted, cellulosic backing layer includes about 60% to about 8% of said resinous strengthening impregnant.
14. In a process for producing a resinous surface covering comprising the steps of forming a felted cellulosic backing layer, coating said backing layer with a foamable resin, coating said foamable resin with a non-foamable resin, and heating said backing layer and said resin to foam said foamable resin and fuse said non-foamable resin, the improvement which comprises:
    (a) impregnating said backing layer prior to said coating steps with 40% to about 85% by weight of the dry felt with a synthetic resinous strengthening impregnant and selected from the group consisting of polymerized vinyl halides, butadiene-styrene latexes, butadiene acrylonitrile resins, acrylic latexes and vinyl chloride-vinyl acetate copolymers,
    (b) adding to said non-foamable resin about 0.25 to about 3.00 phr. of a tin stabilizer,
    (c) thereby producing a surface covering having a high resistance to delamination and discoloration at high temperatures.
15. A process as in claim 14 and wherein:
    (a) said tin stabilizer consists essentially of an organotin stabilizer.
16. A process as in claim 15 and wherein:
    (a) said tin stabilizer consists essentially of an organotin ester.
17. A process as in claim 16 and wherein:
    (a) said organotin ester is dibutyl-tin maleate.
18. A process as in claim 14 and including:
    (a) adding to said foamable resin a minor amount of another stabilizer selected from the group consisting of inorganic zinc and organotin stabilizers and mixtures thereof.
19. A process as in claim 18 and wherein:
    (a) said other stabilizer consists essentially of an organotin ester.
20. A process as in claim 19 and wherein:
    (a) said organotin ester is dibutyl-tin maleate.
21. A process as in claim 14 and wherein:
    (a) said resinous strengthening impregnant consists essentially of an acrylic latex impregnant.
22. A process as in claim 14 and wherein:
    (a) said resinous strengthening impregnant consists essentially of a vinyl impregnant.
23. A process as in claim 22 and wherein:
    (a) said vinyl impregnant consists essentially of a vinyl chloride-vinyl acetate copolymer.
24. A process as in claim 14 and including:
    (a) impregnating said backing layer with about 60% to about 80% by weight of the dry felt with said impregnant.
25. A process as in claim 14 and wherein:
    (a) said felted, cellulosic backing layer has a gauge-to-weight ratio before impregnation of from about 0.80 to about 1.20 to 1, and
    (b) said felted, cellulosic backing layer has a gauge-to-weight ratio after impregnation of from about 0.50 to about 0.80 to 1.
26. A process as in claim 25 and wherein:
    (a) said gauge-to-weight ratio after impregnation is about 0.60 to 0.70 to 1.

References Cited
UNITED STATES PATENTS

| | | | |
|---|---|---|---|
| 3,293,094 | 12/1966 | Nairn et al. | 156—79 |
| 3,433,700 | 3/1969 | Migdol et al. | 156—79 X |
| 3,068,118 | 12/1962 | Biskup et al. | 117—76 FB |
| 3,386,878 | 6/1968 | Pooley | 156—79 X |
| 3,428,471 | 2/1969 | Tuthill et al. | 156—79 X |
| 3,224,894 | 12/1965 | Palmer | 156—79 X |
| 3,276,904 | 10/1966 | Palmer | 117—76 FB |

RALPH HUSACK, Primary Examiner

U.S. Cl. X.R.

117—11, 15; 156—79; 161—160; 260—2.5 P